United States Patent
Häßler et al.

(10) Patent No.: US 11,015,677 B2
(45) Date of Patent: May 25, 2021

(54) TORSIONAL VIBRATION DAMPER WITH TORQUE LIMITER

(71) Applicant: Schaeffler Technologies AG & Co. KG, Herzogenaurach (DE)

(72) Inventors: Martin Häßler, Graben-Neudorf (DE); Alain Rusch, Gambsheim (FR); Laurent Theriot, Strasbourg (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/605,495

(22) PCT Filed: May 4, 2018

(86) PCT No.: PCT/DE2018/100428
§ 371 (c)(1),
(2) Date: Oct. 15, 2019

(87) PCT Pub. No.: WO2018/215018
PCT Pub. Date: Nov. 29, 2018

(65) Prior Publication Data
US 2020/0124107 A1    Apr. 23, 2020

(30) Foreign Application Priority Data
May 23, 2017   (DE) .......................... 102017111185.9

(51) Int. Cl.
*F16F 15/30*   (2006.01)
*F16F 15/14*   (2006.01)
(Continued)

(52) U.S. Cl.
CPC .......... *F16F 15/30* (2013.01); *F16F 15/1435* (2013.01); *F16D 3/12* (2013.01);
(Continued)

(58) Field of Classification Search
CPC .... F16F 15/12; F16F 15/1217; F16F 15/1435; F16F 15/30; F16F 15/31; F16F 2230/0064; F16F 2232/02; F16D 3/12; F16D 7/025
See application file for complete search history.

(56) References Cited

U.S. PATENT DOCUMENTS

| 4,467,905 A | 8/1984 | Takeuchi |
| 4,857,032 A | 8/1989 | Aiki et al. |
(Continued)

FOREIGN PATENT DOCUMENTS

| CN | 103807320 A | 5/2014 |
| DE | 102015211899 A1 | 12/2016 |
(Continued)

OTHER PUBLICATIONS

International Search Report for Corresponding PCT/DE2018/100428.

*Primary Examiner* — Adam D Rogers
(74) *Attorney, Agent, or Firm* — Davidson, Davidson & Kappel, LLC

(57) ABSTRACT

A torsional vibration damper (10) with a torque limiter includes an input part (14), an output part (18), and at least two torque-transmitting intermediate elements (20) arranged between the input part (14) and the output part (18) so as to move radially by cam mechanisms (22) in the case of a relative rotation of the input part (14) and the output part (18). In the case of a relative rotation between the input part and the output part, a torsional characteristic curve (32) of a drive torque over the rotary angle has a damper stage (34) and an end stage (36) which adjoins the damper stage (34), he damper stage (34) specifies a damper capacity of the drive torque over the rotary angle, and the end stage (36) includes a torque limitation of the drive torque over the rotary angle.

17 Claims, 3 Drawing Sheets

(51) Int. Cl.
  *F16D 3/12* (2006.01)
  *F16D 7/02* (2006.01)
(52) U.S. Cl.
  CPC ...... *F16D 7/025* (2013.01); *F16F 2230/0064* (2013.01); *F16F 2232/02* (2013.01)

(56) References Cited

U.S. PATENT DOCUMENTS

| | | | | |
|---|---|---|---|---|
| 6,293,383 | B1 * | 9/2001 | Hoffmann | F16F 15/1238 |
| | | | | 192/204 |
| 7,648,009 | B2 * | 1/2010 | Wack | F16F 15/12366 |
| | | | | 192/3.29 |
| 8,156,842 | B2 * | 4/2012 | Movlazada | F16F 15/12306 |
| | | | | 74/574.4 |

FOREIGN PATENT DOCUMENTS

| | | | | |
|---|---|---|---|---|
| DE | 102018108055 A1 * | 10/2019 | | F16D 13/68 |
| DE | 102018108441 A1 * | 10/2019 | | F16F 15/1204 |
| EP | 0243230 A1 | 10/1987 | | |
| EP | 0474035 A1 | 3/1992 | | |
| EP | 1602854 A2 | 12/2005 | | |
| EP | 2618015 A1 | 7/2013 | | |
| JP | S57-173620 A | 10/1982 | | |
| JP | H09280317 A | 10/1997 | | |
| JP | 2012237429 A | 12/2012 | | |
| WO | WO2004016968 A1 | 2/2004 | | |
| WO | WO-2015192836 A1 * | 12/2015 | | F16F 15/12366 |
| WO | WO2012085966 A1 | 6/2016 | | |

* cited by examiner

TORSIONAL VIBRATION DAMPER WITH TORQUE LIMITER

The present disclosure concerns a torsional vibration damper with torque limiter, in particular for a clutch plate within a drive train of a motor vehicle.

The present disclosure also concerns a clutch plate with the torsional vibration damper according to the present disclosure for arrangement within a drive train of a motor vehicle.

The present disclosure furthermore concerns a flywheel with a clutch plate having the torsional vibration damper according to the present disclosure.

BACKGROUND

Torsional vibration dampers are generally known and are normally arranged between a crankshaft of an internal combustion engine and a drive shaft of a motor vehicle. The crankshaft is excited with periodic interference by the cyclic behavior of the internal combustion engine. To ensure that this interference is not transmitted to the drive train, a torsional vibration damper is provided which shifts the disruptive vibrational resonances occurring in different operating situations into a rotation speed range which lies where possible below the operating rotation speed range. Any vibrational resonances remaining in the operating rotational speed range can be damped via an integrated friction device.

In order to protect the drive train from over-moments on impacts, in some applications the torsional vibration damper is equipped with an overload clutch which is typically designed as a series-connected friction clutch which slips when a specific torque is exceeded and absorbs the energy of the impact.

EP 1 602 854 A2 discloses for example a device for absorbing torque fluctuations. The device is arranged between a crankshaft of an engine and an input shaft on the driven side. The crankshaft is connected to a flywheel on which a damper unit is formed comprising friction linings. The input shaft has a pair of drive plates, a driven plate between the drive plates, and a spring damper. The damper unit with the friction linings grips between the drive plates, and the spring damper exerts a spring force on the friction linings, whereby the friction linings can slip if they receive at least a prespecified torque value, whereby the torque is limited or impacts are absorbed.

The precision with which the desired release moment of the torque limiter can be set is limited by the contact force of the spring damper and the stiffness of the parts holding the spring damper.

DE 10 2015 211 899 A1 furthermore discloses a torsion vibration damper with an input part arranged around a rotation axis, and an output part which is rotatable to a limited extent about the rotation axis relative to the input part against the effect of a spring device. The conversion of the relative rotation within the torsional vibration damper into an axial actuation of the spring device is based exclusively on free movements between components with rolling contacts. For a given capacity of the spring device, by variation of translation ratios, the torsional vibration damper allows the formation of different torsional curves which each use the full capacity of the energy store. The release of a torque limiter is not however described.

SUMMARY

There is a regular need to refine torsional vibration dampers with a torque limiter so that the release moment can be set more precisely. There is also a regular need to reduce manufacturing costs and simplify the structure of a torsional vibration damper with a torque limiter.

An object of the present disclosure is to provide a torsional vibration damper with a torque limiter, in which the release moment of the torque limiter can be set in simple fashion. It is a further object to specify a torsional vibration damper with a torque limiter which may have a reduced installation space and reduced manufacturing costs.

A torsional vibration damper with a torque limiter is provided, in particular for a clutch plate within a drive train of a motor vehicle, with an input part mounted so as to be rotatable about a rotation axis, and an output part arranged so as to be rotatable to a limited extent about the rotation axis relative to the input part against the effect of a spring device, wherein at least two torque-transmitting intermediate elements are arranged between the input part and the output part so as to be moved radially by means of cam mechanisms on a relative rotation of the input part and the output part, wherein due to the configuration of the cam mechanisms and/or a design of the spring device, on a relative rotation between the input part and the output part, a torsion curve of a drive moment over the twist angle is formed which has a damper stage and an end stage adjoining the damper stage, wherein the damper stage specifies a damping capacity of the drive moment over the twist angle, and the end stage comprises a torque limitation of the drive moment over the twist angle.

It is thus an aspect of the present disclosure that the torsional vibration damper with torque limiter has an input part mounted rotatably about a rotation axis, and an output part arranged so as to be rotatable to a limited extent about the rotation axis relative to the input part against the effect of a spring device. The input part may preferably be actively connected to a flywheel arranged on a drive shaft of a motor vehicle. In particular, the input part may preferably be fixedly connected to the flywheel. The drive shaft may preferably be a crankshaft. The output part is preferably coupled or fixedly connected to a drive shaft of a motor vehicle transmission. At least two torque-transmitting intermediate elements are arranged between the input part and output part so as to be moved radially by means of cam mechanisms on a relative rotation of the input part and output part. Due to the configuration of the cam mechanisms and/or the design of the spring device, on a relative rotation between the input part and output part, a torsion curve of a drive moment over the twist angle is formed. The torsion curve has a damper stage and an end stage adjoining the damper stage, wherein the damper stage specifies a damping capacity of the drive moment over the twist angle, and the end stage comprises a torque limitation of the drive moment over the twist angle. This means that due to the configuration of the cam mechanisms and/or the design of the spring device, on a relative rotation between the input part and output part, in the damper stage a torque transmission occurs over the twist angle according to the torsion curve. The end stage begins on reaching the release moment, i.e. a predefined threshold value, wherein the torque transmission is limited as the twist angle increases, whereby preferably impacts can be absorbed. The release moment of the torque transmission may therefore be specified precisely by the design of the cam mechanisms and/or the design of the spring device. Also, the installation space may be reduced since the torque limitation can be achieved preferably by the design of the cam mechanisms. Thus manufacturing costs may also be reduced.

In an exemplary embodiment of the present disclosure, the torsion curve of the end stage has a moment curve which falls, remains constant and/or rises slightly over the twist angle. After reaching the trigger moment, i.e. on transition to the end stage, the cam mechanisms accordingly have a translation ratio such that on further rotation between the input part and output part and further compression of the spring device, a rise in the transmitted drive moment can be reduced and/or avoided. The transmitted moment is preferably reduced, held constant and/or rises slightly over the twist angle of the end stage, in each case such that the energy of impacts can be absorbed in the spring elements of the torsional vibration damper. In the case of a slightly rising moment curve, the moment increase is preferably less than 50% of the maximum moment increase in the damping stage.

In an advantageous embodiment of the present disclosure, it is provided that the cam mechanisms are each formed by radially acting ramp devices, wherein the ramp devices each have two mutually adjacent and differing contours in the traction direction and in the thrust direction. This means that the ramp devices, starting from a neutral position, have two mutually adjacent and differing contours in the traction direction and in the thrust direction. Thus preferably the translation ratio of the cam mechanism can be set by the configuration of the ramp device of the cam mechanism.

In this context, an advantageous refinement of the present disclosure lies in that the mutually adjacent contours have a linear, convex and/or concave form, and/or are configured in free form. Preferably, the first contour may have a convex form in the traction direction, and the second contour adjacent to the first contour may have a linear form. It is also conceivable that the first contour and the second contour have a linear form, wherein the gradient of the linear first contour is different from the gradient of the linear second contour.

According to a refinement of the present disclosure, it is provided that the transition between the mutually adjacent contours of the ramp device in the traction direction and/or the thrust direction forms and/or defines the release moment. In this way, the release moment can be established precisely via the transition between the contours. Thus the translation ratio of the cam mechanism may be established by the design of the second contour, so that the torsion curve of the end stage—i.e. after reaching or exceeding the release moment—has a moment curve which falls, is constant and/or rises slightly over the twist angle.

In a refinement of the present disclosure, it is provided that a roller body is arranged between the mutually complementary contours of a ramp device of a cam mechanism. The roller body is preferably formed as a free rolling, roller-like rolling body which, for axial security, may preferably have an annular rim running at least partially around each end. In this way, a relative rotation between the input part and output part can be translated into a movement of the intermediate elements, preferably via the contours of the ramp device in the cam mechanisms with the roller bodies rolling freely in the respective cam mechanisms between two complementary contours, whereby the spring elements—for both traction and thrust loading—may be actuated in parallel and purely axially. The torsion moment necessary for the movement is transmitted firstly from the input part to the intermediate elements via the respective contour of the ramp device and roller body, and then from the intermediate elements to the output part via the respective contour and roller body.

In principle, the contours of the ramp device may be configured identically in the traction and thrust directions. A refinement of the present disclosure lies in that the contours of the ramp device are formed differently from each other in the traction and thrust directions. In this way, different torsion curves can be produced in the traction direction and in the thrust direction.

A clutch plate is also provided for arrangement within a drive train of a motor vehicle with a torsional vibration damper according to the present disclosure with torque limiter.

The clutch plate is preferably arranged between a drive shaft of a motor vehicle, preferably a crankshaft, and a drive shaft of a motor vehicle transmission. Particularly preferably, the clutch plate is arranged between a flywheel arranged on the crankshaft and the drive shaft of the motor vehicle transmission.

In a refinement of the present disclosure, it is provided that the input part of the torsional vibration damper is connected rotationally fixedly to the flywheel. A rotationally fixed connection between the input part and the flywheel can preferably be created via a bolted connection and/or riveted connection. It is however also conceivable that a rotationally fixed connection between the input part and the flywheel may be created in a different manner. The output part is preferably coupled rotationally fixedly to the drive shaft of the motor vehicle transmission. On a relative rotation between the input part and output part, in particular on an impact, i.e. on greater shocks with differences in rotation speed between the crankshaft and the drive shaft of the motor vehicle transmission, the input part does not slip as is normal in a slipping clutch. At least two torque-transmitting intermediate elements are arranged between the input part and the output part so as to be radially movable by means of cam mechanisms on a relative rotation of the input part and output part. Due to the configuration of the cam mechanisms and/or the design of the spring device, on a relative rotation between the input part and the output part, a torsion curve of a drive moment over the twist angle is formed. The torsion curve has a damper stage and an end stage adjoining the damper stage, wherein the damper stage specifies a damping capacity of the drive moment over the twist angle, and the end stage comprises a torque limitation of the drive moment over the twist angle. This means that, due to the configuration of the cam mechanisms and/or the design of the spring device, on a relative rotation between the input part and output part in the damper stage, a torque transmission takes place over the twist angle according to the torsion curve. The end stage begins on reaching the release moment, i.e. a predefined threshold value, wherein the torque transmission is limited as the twist angle increases, whereby impacts can be absorbed. The release moment of the torque transmission can thus be specified precisely by the design of the cam mechanisms and/or the design of the spring device.

A flywheel is also provided with a clutch plate having a torsional vibration damper according to the present disclosure, wherein the input part of the torsional vibration damper is and/or can be connected rotationally fixedly to the flywheel. In this way, the clutch plate is not coupled to the flywheel like a slipping clutch. Preferably, the rotationally fixed connection of the input part to the flywheel gives a rotationally fixed, force-fit connection. The rotationally fixed connection may preferably be a bolted connection and/or a riveted connection. However, other connection possibilities are conceivable for creating a rotationally fixed connection between the flywheel and the input part.

BRIEF SUMMARY OF THE DRAWINGS

The present disclosure is now explained as an example below with reference to the attached drawings showing exemplary embodiments, wherein the features outlined below constitute aspects of the present disclosure individually and also in combination. The drawings show.

DETAILED DESCRIPTION

Figure 1:
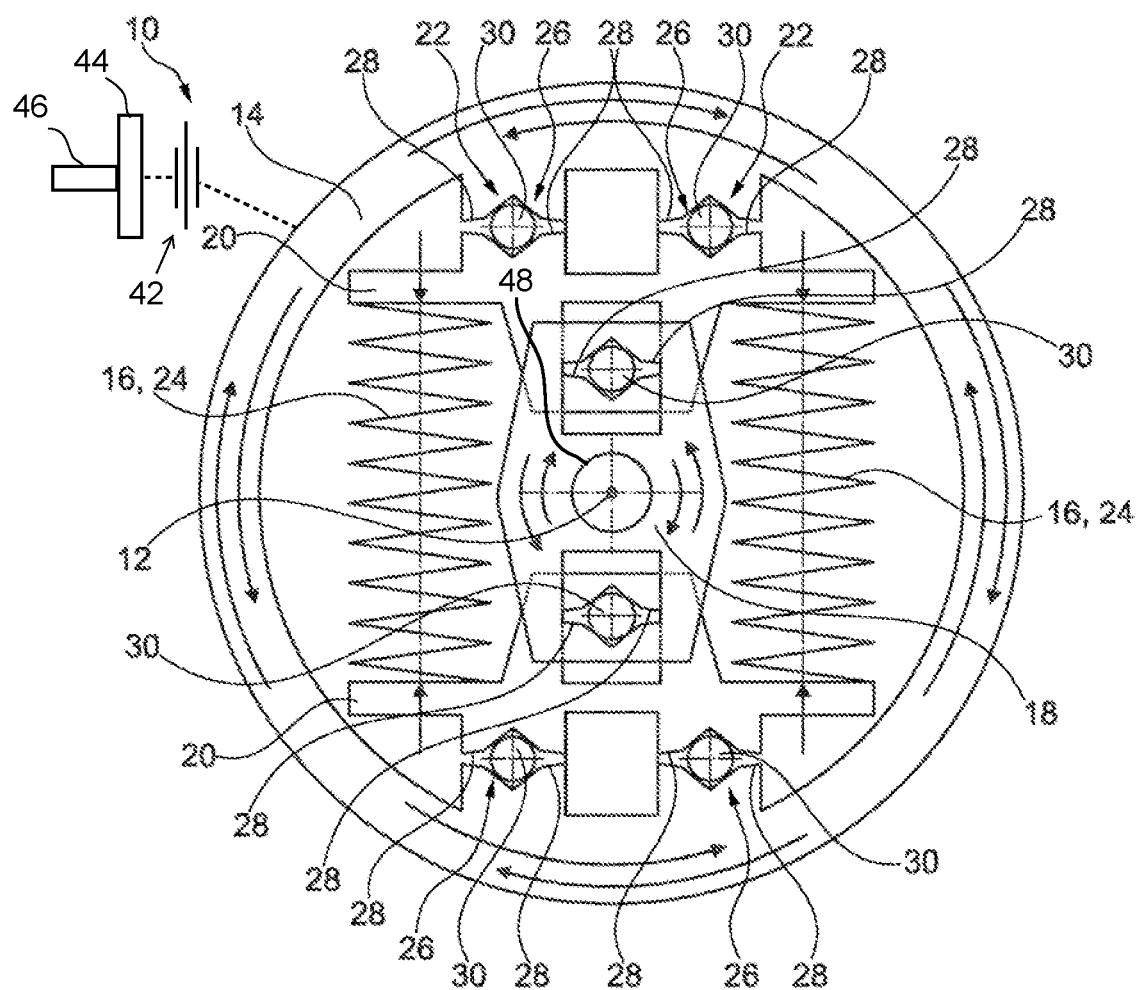
FIG. 1: a torsional vibration damper with torque limiter in diagrammatic depiction, according to an exemplary embodiment of the present disclosure.

FIG. 1 shows a torsional vibration damper 10 with torque limiter in a diagrammatic depiction. The torsional vibration damper 10 comprises an input part 14 mounted so as to be rotatable about a rotation axis 12, and an output part 18 arranged so as to be rotatable to a limited extent about the rotation axis 12 relative to the input part 14 against the effect of a spring device 16. Two torque-transmitting intermediate elements 20 are arranged between the input part 14 and the output part 18, each coupled to the input part 14 and output part 18 via cam mechanisms 22, and are configured so as to move radially on a relative rotation of the input part 14 and the output part 18. The spring device 16 is arranged between the intermediate elements 20 and comprises at least two spring elements 24 or energy stores arranged spaced apart from each other. As shown schematically in FIG. 1, torsional vibration damper 10 is for a clutch plate 42 that may be arranged between a flywheel 44, which is arranged on a crankshaft 46, and a transmission drive shaft 48.

Figure 2:
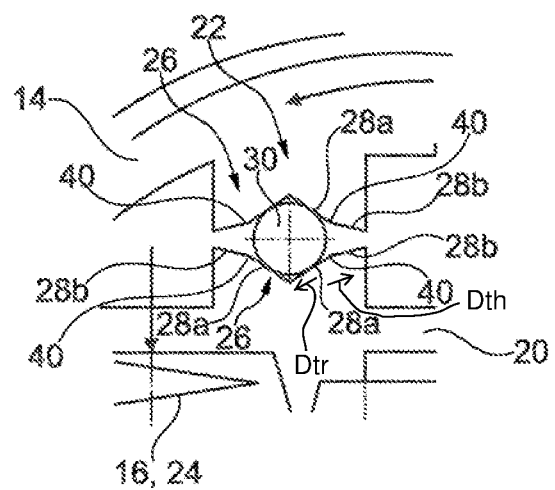
FIG. 2: a cam mechanism in diagrammatic depiction according to an exemplary embodiment of the present disclosure.

The input part 14 is thus coupled to the output part 18 via the intermediate elements 20, wherein two cam mechanisms 22 are formed between the input part 14 and the respective intermediate element 20, and the output part is coupled to the respective intermediate element 20 via a cam mechanism 22. The respective cam mechanisms 22 are constructed identically, wherein as an example a cam mechanism 22 between the input part 14 and the intermediate element 20 is described in detail and shown in FIG. 2.

The cam mechanism 22 is formed by ramp devices 26 arranged complementarily to each other on the input part 14 and output part 20, wherein the respective ramp device 26 has two mutually adjacent and differing contours 28 in the traction direction Dtr and in the thrust direction Dth, i.e. a first contour 28a and a second contour 28b, and a roller body 30 in the form of a roller-like rolling element is arranged between the ramp devices 26.

In principle, the mutually adjacent contours 28 may have a linear, convex or concave form, or be configured in free form. In the present exemplary embodiment, the mutually adjacent first contours 28a and second contour 28b each have a linear design with different gradients.

Figure 3:
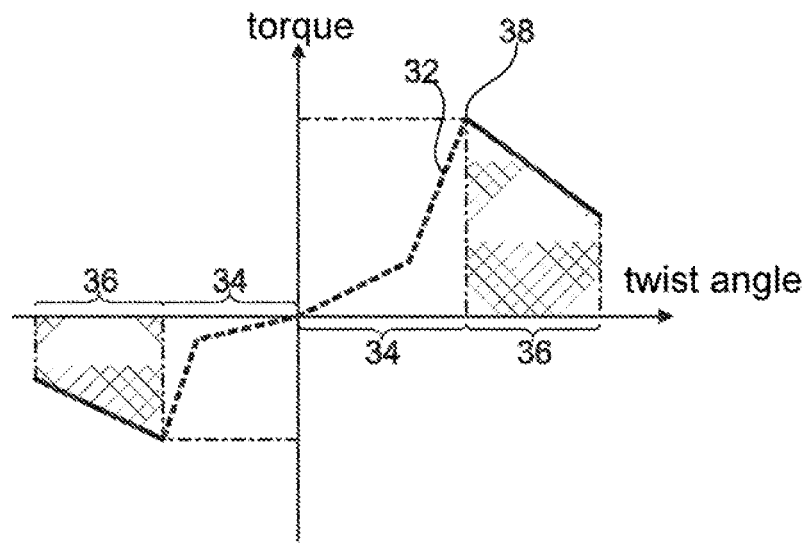
FIG. 3: a configuration of a torsion curve with end stage according to an exemplary embodiment of the present disclosure.
Figure 4:
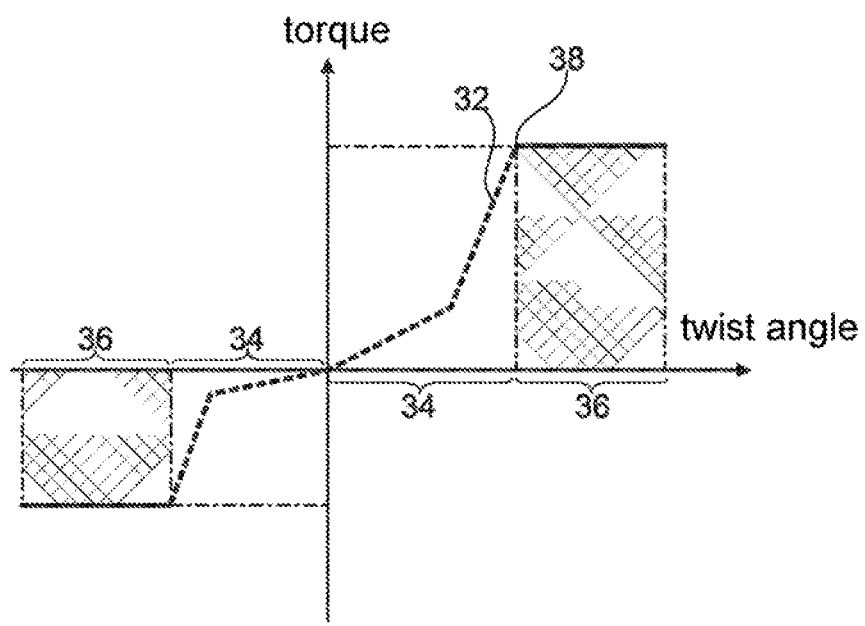
FIG. 4: a further configuration of a torsion curve with end stage according to an exemplary embodiment of the present disclosure.
Figure 5:
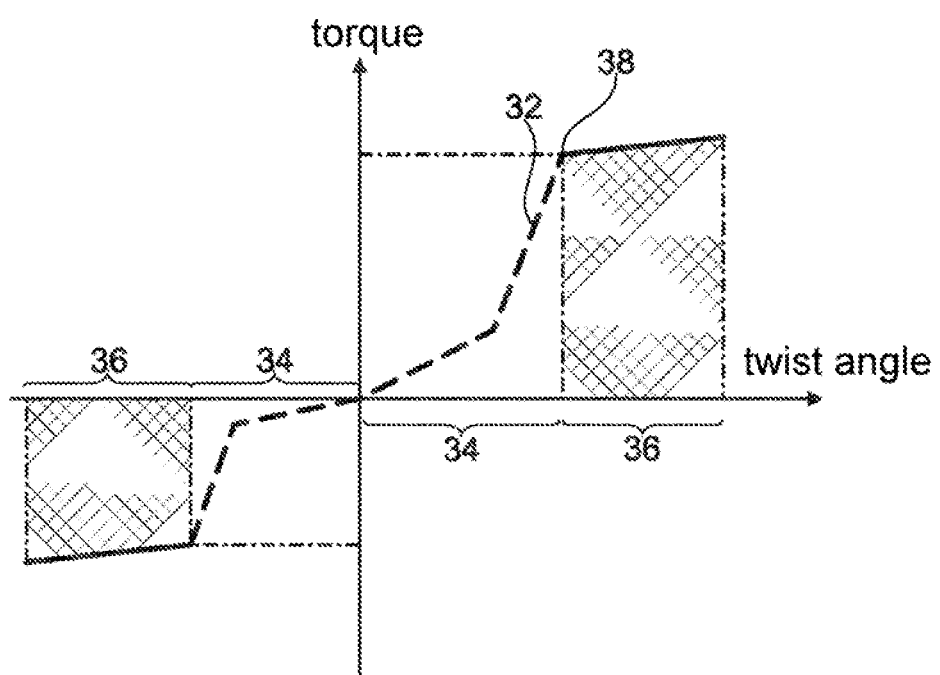
FIG. 5: a further configuration of a torsion curve with end stage according to an exemplary embodiment of the present disclosure.

On a relative rotation between the input part 14 and output part 18, due to the configuration of the cam mechanisms 22 and the design of the spring device 16, a torsion curve 32 of a drive moment over the twist angle is formed, as shown preferably in FIGS. 3 to 5. The torsion curve 32 has a damper stage 34 and an end stage 36 adjacent to the damper stage 34, wherein the damper stage 34 specifies a damping capacity of the drive moment over the twist angle, and the end stage 36 comprises a torque limitation of the drive moment over the twist angle. This means that, due to the configuration of the cam mechanisms 22, in particular the configuration of the contours 28 of the ramp device 26 of the cam mechanisms 22, and the design of the spring device 16, on a relative rotation between the input part 14 and output part 18 in the damper stage 34, a torque transmission occurs over the twist angle according to the torsion curve 32. The end stage begins on reaching the release moment 38, wherein the torque transmission is limited as the twist angle increases, whereby preferably impacts can be absorbed.

The transition 40 between the adjacent contours 28, in particular the first contour 28a and the second contour 28b, of the ramp device 26 in the traction direction and/or the thrust direction preferably defines the release moment. The release moment 38 of the torque transmission may therefore be specified precisely by the design of the cam mechanisms 22.

FIGS. 3 to 5 show diagrams of different torsion curves 32 in which the torque or drive moment is shown over the twist angle of the input part 14 relative to the output part 18. The torsion curve 32 is effective in the thrust direction and the traction direction, and has a two-stage damping stage 34 and a single-stage end stage 36 adjoining the damping stage 34 as the twist angle increases. The thrust and traction stages of the torsion curve are established by the respective design of the ramp device 26, in particular the contours 28, and the design of the spring device 16.

The damping stage 34 has a softer first spring stage and a harder second spring stage. After reaching a threshold value of the drive moment, i.e. after the release moment 38, and a predefined twist angle, no further or significant moment increase occurs in the end stage 36. After reaching the release moment 38, i.e. on transition to the end stage 36, the cam mechanisms have a translation ratio so that, on further twist and further compression of the spring device 16, the transmitted moment is no longer increased. The transmitted torque falls back over the twist angle of the end stage 36, as indicated by the falling path of the torsion curve 32 in the end stage 36.

FIG. 4 shows a further torsion curve 32. In contrast to the torsion curve 32 shown in FIG. 3, the course in the end stage 36 is constant.

FIG. 5 shows a further torsion curve 32. In contrast to the torsion curve 32 shown in FIG. 3, the course of the torsion curve 32 in the end stage 36 shows a moment curve which rises slightly over the twist angle. In the case of a slightly rising moment curve, the moment increase is smaller than 50% of the maximum moment increase in the damping stage 34.

The torque or drive moment transmitted is thus reduced, held constant or rises slightly over the twist angle of the end stage 36, in such a manner that the energy of impacts can be absorbed in the spring elements 16 of the torsional vibration damper 10.

LIST OF REFERENCE SIGNS

10 Torsional vibration damper
12 Rotation axis

14 Input part
16 Spring device
18 Output part
20 Intermediate element
22 Cam mechanism
24 Spring element
26 Ramp device
28 Contour
28a First contour
28b Second contour
30 Roller body
32 Torsion curve
34 Damper stage
36 End stage
38 Release moment
40 Transition

The invention claimed is:

1. A torsional vibration damper for a drive train of a motor vehicle, the torsional vibration damper comprising:
an input part mounted so as to be rotatable about a rotation axis;
an output part;
a first torque-transmitting intermediate element and a second torque-transmitting intermediate element arranged between the input part to the output part;
at least one spring connecting the first torque-transmitting intermediate element and the second torque-transmitting intermediate element such that the output part is arranged so as to be rotatable to a limited extent about the rotation axis relative to the input part against an effect of the at least one spring;
a first cam mechanism coupling the first torque-transmitting intermediate element to the input part;
a second cam mechanism coupling the second torque-transmitting intermediate element to the input part;
a third cam mechanism coupling the first torque-transmitting intermediate element to the output part; and
a fourth cam mechanism coupling the second torque-transmitting intermediate element to the output part,
at least one of the first, second, third and fourth cam mechanisms including two ramp devices facing each other and each having two mutually adjacent contours each having two different gradients.

2. The torsional vibration damper as claimed in claim 1, wherein each of the first, second, third and fourth cam mechanisms are identical.

3. The torsional vibration damper as claimed in claim 1, wherein each of the first, second, third and fourth cam mechanisms includes the two ramp devices and a roller body provided radially between the two ramp devices.

4. The torsional vibration damper as claimed in claim 1, wherein the first cam mechanism includes the two ramp devices and has first contours on the input part formed by the two mutually adjacent contours of one of the ramp devices, first contours on the first torque-transmitting intermediate element formed by the two mutually adjacent contours of the other of the ramp devices and a first roller body held between the first contours on the input part and the first counters on the torque-transmitting intermediate element; and
wherein the second cam mechanism includes the two ramp devices and has second contours on the input part formed by the two mutually adjacent contours of one of the ramp devices, first contours on the second torque-transmitting intermediate element formed by the two mutually adjacent contours of the other of the ramp devices and a second roller body held between the second contours on the input part and the first contours on the second torque-transmitting intermediate element.

5. The torsional vibration damper as claimed in claim 4, wherein the third cam mechanism includes the two ramp devices and has second contours on the first torque-transmitting intermediate element formed by the two mutually adjacent contours of one of the ramp devices, first contours on the output part formed by the two mutually adjacent contours of the other of the ramp devices and a third roller body held between the second contours on the first torque-transmitting intermediate element and the first contours on the output part; and
the fourth cam mechanism includes the two ramp devices and has second contours on the second torque-transmitting intermediate element formed by the two mutually adjacent contours of one of the ramp devices, second contours on the output part formed by the two mutually adjacent contours of the other of the ramp devices and a fourth roller body held between the second contours on the second torque-transmitting intermediate element and the second contours on the output part.

6. The torsional vibration damper as claimed in claim 1 wherein the first, second, third and fourth cam mechanisms and/or the spring are configured such that, on a relative rotation between the input part and the output part, a torsion curve of a drive moment over a twist angle is formed which has a damper stage and an end stage adjoining the damper stage, the damper stage specifying a damping capacity of the drive moment over the twist angle, and the end stage comprising a torque limitation of the drive moment over the twist angle.

7. The torsional vibration damper as claimed in claim 1 further comprising:
a fifth cam mechanism coupling the first torque-transmitting intermediate element to the input part, the fifth cam mechanism being circumferentially offset from the third cam mechanism; and
a sixth cam mechanism coupling the second torque-transmitting intermediate element to the input part, the sixth cam mechanism being circumferentially offset from the fourth cam mechanism.

8. The torsional vibration damper as claimed in claim 1 wherein the at least one spring includes a first spring extending from the first torque-transmitting intermediate element to the second torque-transmitting intermediate element and a second spring extending from the first torque-transmitting intermediate element to the second torque-transmitting intermediate element.

9. A torsional vibration damper for a drive train of a motor vehicle, the torsional vibration damper comprising:
an input part mounted so as to be rotatable about a rotation axis;
an output part arranged so as to be rotatable to a limited extent about the rotation axis relative to the input part against an effect of a spring device; and
at least two torque-transmitting intermediate elements arranged between the input part and the output part so as to be moved radially by cam mechanisms upon a relative rotation of the input part and the output part,
the cam mechanisms and/or the at least one spring being configured such that, on a relative rotation between the input part and the output part, a torsion curve of a drive moment over a twist angle is formed which has a damper stage and an end stage directly adjoining the damper stage, the damper stage specifying a damping capacity of the drive moment over the twist angle, and the end stage comprising a torque limitation of the drive moment over the twist angle where the drive moment decreases, becomes constant or increases at a moment increase that is smaller than 50% of a maximum moment increase in the damper stage, a rate of change of the drive moment with respect to the twist angle decreasing during a transition from the damper stage to the end stage, the damper stage having a first spring stage and a second spring stage, the second spring stage having a greater drive moment increase than the first spring stage, the second spring stage directly adjoining the end stage.

10. The torsional vibration damper as claimed in claim 9, wherein the cam mechanisms are each formed by radially acting ramp devices, the ramp devices each having two mutually adjacent and differing contours in a traction direction and in a thrust direction.

11. The torsional vibration damper as claimed in claim 10, wherein the two mutually adjacent and differing contours have a linear, convex or concave form.

12. The torsional vibration damper as claimed in claim 10, wherein a transition between the two mutually adjacent and differing contours in the traction direction and/or the thrust direction forms a release moment.

13. The torsional vibration damper as claimed in claim 10, further comprising a roller body arranged between the two mutually adjacent and differing contours.

14. The torsional vibration damper as claimed in claim 10, wherein the two mutually adjacent and differing contours are formed differently from each other in the traction and thrust directions.

15. An assembly comprising:
the torsional vibration damper as claimed in claim 9; and
a clutch plate in arrangement with the torsional vibration damper.

16. An assembly comprising:
the assembly as recited in claim 15; and
a flywheel, the input part of the torsional vibration damper being connected rotationally fixedly to the flywheel.

17. A method of constructing a torsional vibration damper for a drive train of a motor vehicle, the method comprising:
arranging at least two torque-transmitting intermediate elements between an input part and an output part so as to be movable radially by cam mechanisms coupling the at least two torque-transmitting intermediate elements to the input part and output part upon a relative rotation of the input part and the output part about a rotation axis against an effect of at least one spring, the cam mechanisms and/or the at least one spring being configured such that, on the relative rotation between the input part and the output part, a torsion curve of a drive moment over a twist angle is formed which has a damper stage and an end stage directly adjoining the damper stage, the damper stage specifying a damping capacity of the drive moment over the twist angle, and the end stage comprising a torque limitation of the drive moment over the twist angle where the drive moment decreases, becomes constant or increases at a moment increase that is smaller than 50% of a maximum moment increase in the damper stage, a rate of change of the drive moment with respect to the twist angle decreasing during a transition from the damper stage to the end stage, the damper stage having a first spring stage and a second spring stage, the second spring stage having a greater drive moment increase than the first spring stage, the second spring stage directly adjoining the end stage.

* * * * *